(12) United States Patent
Rao et al.

(10) Patent No.: US 7,548,609 B2
(45) Date of Patent: Jun. 16, 2009

(54) PROCESS FOR SCALABLE CONVERSATION RECORDING

(75) Inventors: Siddhartha Rao, Indianapolis, IN (US); Anthony Burke, Noblesville, IN (US); Sukanta Majumdar, Westfield, IN (US); Leslie Ramer, Indianapolis, IN (US); Jeffrey Thompson, Indianapolis, IN (US)

(73) Assignee: CTI Group (Holding), Inc., Indianapolis, IN (US)

( * ) Notice: Subject to any disclaimer, the term of this patent is extended or adjusted under 35 U.S.C. 154(b) by 0 days.

(21) Appl. No.: 11/735,207

(22) Filed: Apr. 13, 2007

(65) Prior Publication Data

US 2008/0063167 A1   Mar. 13, 2008

Related U.S. Application Data

(60) Provisional application No. 60/842,664, filed on Sep. 7, 2006.

(51) Int. Cl.
*H04M 1/68* (2006.01)

(52) U.S. Cl. ............... 379/68; 379/142.13; 379/265.06; 455/410; 705/10; 713/193

(58) Field of Classification Search ................ 379/67.1, 379/265.06, 68, 142.13; 455/410; 713/193; 705/10
See application file for complete search history.

(56) References Cited

U.S. PATENT DOCUMENTS

| | | | | |
|---|---|---|---|---|
| 5,535,261 | A * | 7/1996 | Brown et al. | 379/88.11 |
| 5,544,231 | A * | 8/1996 | Cho | 379/88.24 |
| 6,430,270 | B1 * | 8/2002 | Cannon et al. | 379/88.19 |
| 6,988,205 | B2 * | 1/2006 | Walker et al. | 713/193 |
| 7,043,008 | B1 * | 5/2006 | Dewan | 379/265.06 |
| 7,155,207 | B2 * | 12/2006 | Chapman et al. | 455/410 |
| 2004/0028193 | A1 * | 2/2004 | Kim | 379/68 |
| 2004/0136503 | A1 * | 7/2004 | Kass | 379/67.1 |
| 2005/0141678 | A1 * | 6/2005 | Anders | 379/67.1 |
| 2007/0041558 | A1 * | 2/2007 | Parayil et al. | 379/219 |
| 2007/0232297 | A1 * | 10/2007 | Noda et al. | 455/426.2 |
| 2007/0263819 | A1 * | 11/2007 | Finkelman et al. | 379/201.11 |
| 2008/0040199 | A1 * | 2/2008 | Pinhanez | 705/10 |

* cited by examiner

*Primary Examiner*—Gerald Gauthier
(74) *Attorney, Agent, or Firm*—Blank Rome LLP

(57) ABSTRACT

A system and a method for selectively intercepting audio and video conversations over a wide area computer network, for monitoring, storing, and contributing to these conversations and reconstructing the associated communications session upon request.

34 Claims, 3 Drawing Sheets

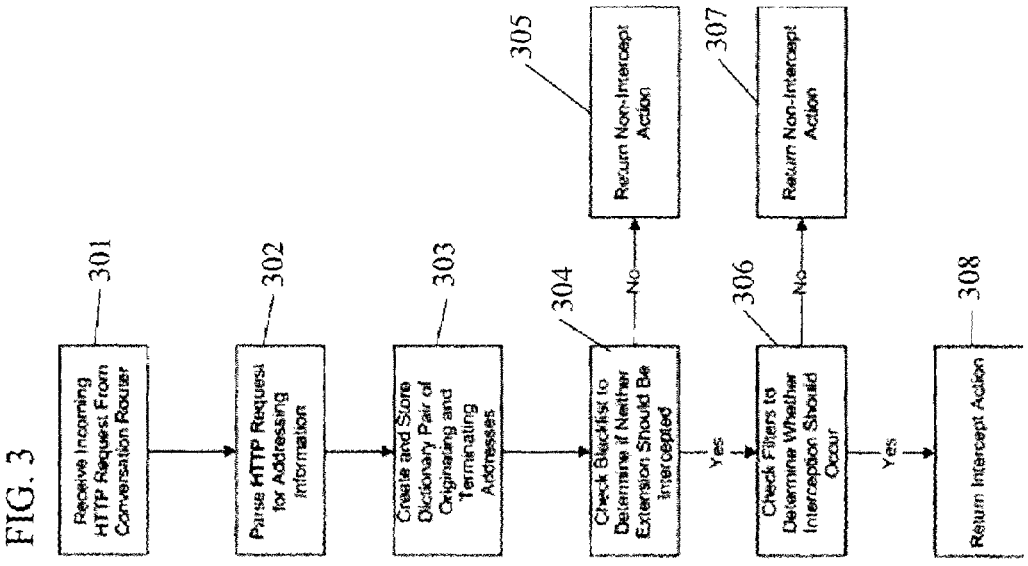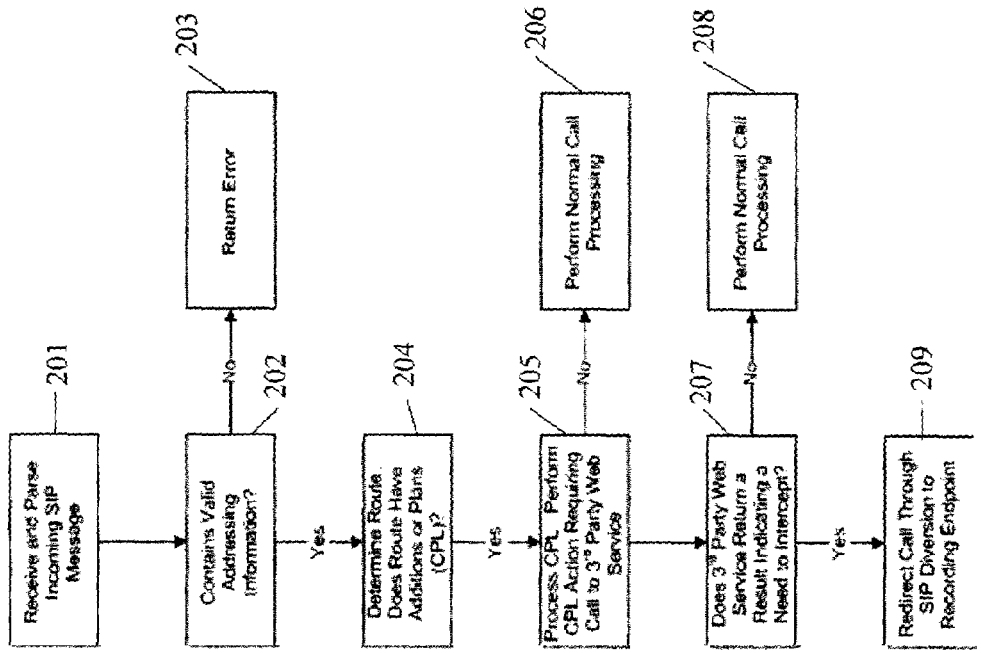

FIG. 4

```
Example Session Initiation Protocol Request With SDP
INVITE
sip:UAB@example.com
SIP/2.0
Via: SIP/2.0/UDP 10.20.30.40:5060
From: UserA <sip:UAA@example.com>;tag=589304
To: UserB <sip:UAB@example.com>
Call-ID: 8204589102@example.com
CSeq: 1 INVITE
Contact: <sip:UserA@10.20.30.40>
Content-Type: application/sdp
Content-Length: 141 v=0
o=UserA 2890844526 2890844526 IN IP4 10.20.30.40
s=Session SDP
c=IN IP4 10.20.30.40
t=3034423619 0
m=audio 49170 RTP/AVP 0
a=rtpmap:0 PCMU/8000

Example Session Initiation Protocol Response With SDP
SIP/2.0
200 OK
From: UserA <sip:UAA@example.com>;tag=589304
To: UserB <sip:UAB@example.com>;tag=314159
Call-ID: 8204589102@example.com
CSeq: 1 INVITE
Contact: <sip:UserB@10.20.30.41>
Content-Type: application/sdp
Content-Length: 140 v=0
o=UserB 2890844527 2890844527 IN IP4 10.20.30.41
s=Session SDP
c=IN IP4 10.20.30.41
t=3034423619 0
m=audio 3456 RTP/AVP 0
a=rtpmap:0 PCMU/8000
```

PROCESS FOR SCALABLE CONVERSATION RECORDING

CROSS REFERENCE TO RELATED APPLICATIONS

The present application claims the benefit of U.S. Provisional Patent Application No. 60/842,664, filed Sep. 7, 2006, whose disclosure is hereby incorporated by reference in its entirety into the present disclosure.

FIELD OF THE INVENTION

The present invention is of a method and system for intercepting audio, video, and messaging conversations across a wide area computer network, and in particular selectively intercepting such conversations for the purposes of monitoring, storing, and contributing to these conversations.

DESCRIPTION OF RELATED ART

The increased availability of high capacity broadband internet access to businesses has increased the prevalence of internet based telephony, video conferencing, and instant messaging. Further, businesses are looking to outsource many capabilities that were typically accomplished internally, such as the management and maintenance of communications systems. As a result, service providers now provide facilities to organizations to outsource their entire communications network. The transport for such services is typically a wide area network, such as the internet, an intranet or Virtual Private Network.

Internet telephony and communications reduce the total cost of ownership for an organization while enabling new and compelling features, such as the ability to "hotel": users can use their hotel phone as though it was their desk phone at their office, or the ability to simultaneously ring multiple handsets, including mobile phones. This business case drives small to medium sized enterprises to adopt internet telephony. Service providers provide this facility by sharing a sophisticated, high volume communications infrastructure with multiple end-users ("multi-tenant").

Organizations have long had requirements to record and intercept conversations. For example voicemail, and eventually digital voicemail and unified messaging, are commercially prerequisite features in audio and video interactions. Recently, statutory, regulatory, and quality management reasons have required phone conversations to be recorded without requiring any action by the participants of the conversations ("blanket recording"). This facility ensures that all conversations, regardless of the actions of either participant, are recorded.

In LAN environments, recording these conversations is accomplished by capturing and monitoring the packets that are transmitted across the network, determining if they need to be recorded, and streaming the content to a storage database. See, for example, U.S. Pat. No. 6,122,665: Communication Management System for Computer Network-Based Telephones. This method is satisfactory for a limited number of users or where all traffic passes through a single switch, router, physical or virtual pipe. This method, however, invariably does not scale for multi-tenant service providers due to the high volume of packets, diverse routes and conversations. In this method, every conversation packet must be analyzed and filtered to determine if it needs to be recorded. When this method encounters a significant volume of traffic, where only a fraction of that volume needs to be recorded, the method leads to latency in monitoring and recording, reducing the quality of the overall user experience.

Further, this method leads to inadequacy in the ability to contribute to the actual conversation. The scenario for this is simple: in a call center, it becomes necessary to coach an agent while they are currently in the conversation, commonly referred to as "Whisper," or directly contribute in the conversation to both parties, commonly referred to as "Barge." Such contribution requires direct access to the actual audio, video, or messaging conversation which cannot be accomplished in traditional packet inspection, recording, and streaming mechanisms. Those functions are complementary to the ability to monitor and record the actual conversation.

There is therefore a need for, and it would be highly advantageous to have, a system and a method for scalable recording, monitoring, and contributing audio, video, and messaging conversations over a high capacity wide area network, such as the internet.

SUMMARY OF THE INVENTION

It is one object of the present invention to modify the routing plans, commonly referred to as a "Dial Plan" or an "Extension Plan," of a service provider's switching infrastructure to route selective phone, video or messaging conversations to a recording, monitoring, and contribution device and endpoint.

It is another object of the present invention to modify those routing plans based upon the routing guidance provided by a third party routing control service. It is still another object of the present invention to provide a mechanism to proxy those recorded and monitored conversations to yet another endpoint.

It is yet another object of the present invention to convert those recorded and monitored conversations into an audio, video, or messaging format that is suitable for large volume storage and retrieval as the conversation is in progress. Further, it is another object of the present invention to enable end-users to leverage an additional user or programmatic interface, commonly web based, to redirect a portion or all of the conversation to another conversation endpoint for the purposes of monitoring or contributing to the conversation.

Those and other objects of the present invention are explained in further detail with regard to the drawings, description, and claims provided below. The preferred embodiment of the invention involves five components: the service provider's internet protocol (IP) conversation router (preferably their class 5 soft switch or session border controller), host media processor(s), a storage and web based retrieval facility for recordings and performing monitoring or contribution functions, the initiating conversation endpoint, and the terminating conversation endpoint. The service provider's conversation router preferably has a routing or dialing plan which determines the routing of audio packets, video packets, or messaging packets through the service provider's infrastructure.

In a preferred embodiment of the invention, the service provider's conversation router supports additions or modules in the routing plan. Those additions or modules preferably adhere to the Call Processing Language specification or other variants. In the preferred embodiment of the invention, the initiating and terminating endpoints are Session Initiation Protocol (SIP) endpoints, such as a SIP interoperable telephone, trunk, public switched telephone network (PSTN) gateway, or Private Branch Exchange (PBX).

The steps for performing recording, monitoring, and contribution are as follows. The initiating endpoint initiates a conversation with the service provider's conversation router. That is accomplished by transmitting a conversation invitation. For example, the initiating endpoint might transmit a SIP INVITE specifying an initiating address and terminating address for a conversation.

The service provider's conversation router then examines that invitation, specifically examining the initiating or terminating address, or diversion information contained in the invitation. Based upon those three parameters and by inspection of the routing plan, if the conversation is meant to be recorded, monitored, or contributed to, a specific addition or module (CPL document) is applied to the conversation.

That addition or module indicates to the service provider's conversation router to transmit to a third party service, data about the conversation that is attempting to be initiated. In the preferred embodiment of the invention, that third party leverages the Hyper Text Transport Protocol (HTTP), although other transmission protocols may be used as required by the network protocols in use. That third party service, or intermediary to a third party service, inspects the request, specifically capturing information about the initiating and terminating endpoints. After inspection is complete, the third party service queries a database to determine if the conversation should be monitored, recorded, or contributed to. In the preferred embodiment of the invention, that query is accomplished by a XML web service, although alternative means might be utilized, such as Microsoft SQL Query Tabular Data Streams or Oracle Stored Procedures.

The query may return results indicating that the conversation should not be recorded for a variety of reasons, including but not limited to network outage, recording service unavailability, either the initiating or terminating party has been "blacklisted" or has a block on recording facilities, or that security credentials are not present to record the conversation. Further, filtering criteria might be applied in this query, including but not limited to time of day, random probability, current day of the week, initiating or terminating address, diversion information, or other parameters determined during initiation.

If the results of the query indicate that the conversation is to be recorded, the third party service transmits a message to the service provider conversation router with results indicating that the conversation should be recorded. If the results indicate that the conversation is not to be recorded, the conversation is routed normally without utilizing the routing plan addition or module or the conversation is dropped. If the results indicated that the conversation should be recorded, the service provider's conversation router now inspects the routing plan module or addition to determine the location or route to the host media processor.

The service provider's conversation router then routes the conversation initiation request to the host media processor. The host media processor receives the initiation request and examines the addressing of the request, including the initiation address or termination address of the request. A database query is executed at this point to create a call object. That call object is represented by a record in a database table. In the preferred embodiment of the present invention, that object is created via XML Web Services although other methods can be utilized.

The host media processor then sends a conversation initiation request to either the conversation router from which it received the original initiation request, or if configured differently, a secondary conversation router. The conversation router routes this initiation request as per the normal routing rules configured for the router. At this point in the conversation, two conversations are created: the first conversation leg (hereinafter referred to as the "originating leg") between the initiating endpoint, the service provider's conversation router, and the host media processor, and the second conversation leg (hereinafter referred to as the "terminating leg") between the host media processor, a conversation router, and the terminating endpoint.

As conversation requests or responses occur on either the terminating or originating legs of the conversation, those events are passed to the complementary leg of the conversation. In the preferred embodiment of the invention, the host media processor is effectively a SIP Back to Back User Agent (B2BUA). As those events occur, those state changes are reflected in the call object, stored in the database.

One aspect of conversation initiation is media negotiation. In the case of messaging, this negotiation is trivial, but that is not the case with audio or video data. In the preferred embodiment of the invention, media negotiation is differentiated between the originating and terminating leg, in the sense that the originating leg may leverage a different transport, encoder/decoder (CODEC), or signaling mechanism than the terminating leg. The host media processor auto-negotiates those variances.

Another aspect of conversation is the re-initiation of the conversation to redirect to other alternative conversation endpoints. An example of this would be voice mail or music on hold services. When either leg receives a re-initiation request, that re-initiation request is transferred to the complementary leg by the host media processor, ensuring proper conversation control and state.

Once media is negotiated, media transport begins on the originating and terminating legs. When media is received on either leg, it is transmitted to the complementary leg. It is further mixed and, if audio, the conversation could be echo-cancelled at that point as well. In alternative embodiments of the present invention, a stereo or multi-channel copy of audio content might be created, with each channel representing a specific leg of the conversation. A single unified stream of media is created, in a native, uncompressed format (e.g. G.711 or G.722). That uncompressed format is streamed to an encoding component, which in turn converts it into a compressed format, in real-time (e.g. MPEG 2.5 Layer III). In the preferred embodiment of the present invention, real-time encoding reduces the intensity of computing processing by preventing latent, high utilization activities after a conversation has been completed.

A user interface is provided to end-users. In the preferred embodiment of the present invention, that interface is web-based and accesses the call object database. That call object database contains all current call objects as well as historical call objects and is segmented by user, tenant, and other dimensions. The end-user has secure visibility into in-progress conversations as well as historical, recorded conversations.

In the preferred embodiment of the present invention, the end-user can retrieve a report of current conversations in progress. Three icons are provided for each call, indicating the ability to "Monitor", "Whisper", or "Barge" into the conversation. If action is initiated on any of those three icons, the end-user is presented with an interface asking for the entry of a phone number. Optionally and preferably, that phone number is historically stored and retrieved on a per end-user basis. When they enter a phone number and activate the interface, the recording service sends a web service message to the host media processor, indicating that a particular call object needs to be contributed to, in a whisper, monitoring, or barge facility.

The host media processor, in turn, creates yet another conversation leg (hereinafter referred to as the "contribution leg") and initiates a conversation with the service provider's conversation router or, optionally, another conversation router. That conversation leg is terminated and media is negotiated. Before media is negotiated, depending on whether the end-user wanted to barge, whisper, or monitor the conversation, the contribution leg might be setup in a half-duplex, or full-duplex to the initiating or terminating party only.

Throughout this document, the term "Internet" is used to generally designate the global, linked web of millions of networks which is used to connect computers all over the world. That includes, but is not limited to all intranet, private internet and virtual private internet networks. The term "Internet Telephony" is used to generally designate the peer-to-peer, centralized, or decentralized audio, video, or message conversations between two endpoints across the Internet. The term "Endpoint" generally designates an audio, video, or messaging device that may or may not be operated by a human being. And "Endpoint" may also represent, but is not limited to, a public switched telephone network (PSTN) interface or gateway, plain old telephone system (POTS), or an Integrated Services Digital Network (ISDN) interface. An Endpoint may also represent a Session Border Controller (SBC), soft switch, or media server.

Throughout this document, the term "Conversation Router" and "Host Media Processor" includes, but is not limited to, personal computers (PC) or servers having any branded operating system such as DOS, Windows, OS/2, Linux, Mac OS, Sun Solaris, Java Workstations, Open BSD, Free BSD, AIX, AT&T UNIX, or any other known or available operating system. Such Conversation Router or Host Media Processor may utilize a variety of conversation signaling protocols, including, but not limited to, session initiation protocol (SIP), H.323 (incorporated by reference H.225.0, H.245, H.261, H.263, H.225), Cisco "Skinny", Signaling System 7 (SS7), or MGCP. The Conversation Router or Host Media Processor may further utilize a variety of connection oriented or connection-less conversation media transports, including Transmission Control Protocol over Internet Protocol (TCP/IP), User Datagram Protocol over Internet Protocol (UDP/IP), Frame Relay, ATM, or ISDN. The Conversation Router or Host Media Processor may further utilize a variety of media formats, including but not limited to, G.711 (u-Law), G.722 (a-Law), G.729, GSM, MPEG-2 transport or program streams (audio and video), MPEG-4 (audio or video), MPEG 2.5 Layer III, Windows Media Audio, Windows Media Video, Apple QuickTime, BroadVoice-32, BroadVoice-32 FEC, DVI4, DVI4 Wideband, iLBC, L16 PCM Wideband, ADPCM, PCM, Speex, Speex FEC, Speex Wideband, Speex Wideband FEC, H.263, H.264, H.264+, Polycom TrueVoice, Polycom Wideband Voice, ASCII text, Unicode text, UTF-7, UTF-8, JPEG, GIF, PNG, DIB, or BMP.

Throughout this document, the term "Storage and Web Presentation Unit" is used to generally designate a database computing device with a user-interface presentation engine. That database device may utilize a variety of database facilities, including but not limited to, Microsoft SQL Server, Oracle Database Objects, POSTGRES SQL, MySQL, flat delimited files, in memory data structures, or Berkeley DB. The user-interface presentation engine might leverage a variety of platforms including but not limited to Microsoft ASP .NET, Sun J2EE, Microsoft ASP, Crystal Reports, Microsoft Reporting Services, Business Objects Server, or Oracle Reports.

It must be further noted that any messaging, especially related to signaling or media transport, may or may not involve intermediaries, other routers, or other network elements which do not affect the net result of the conversation.

BRIEF DESCRIPTION OF THE DRAWINGS

The invention is herein described, by way of example only, with reference to the accompanying drawings, wherein:

FIG. 2 is a flowchart of the dial plan and routing method according to the present invention;

FIG. 3 is a flowchart of the third party service used to indicate whether a conversation should be intercepted, monitored, or contributed to; and FIG. 4 is an example Session Initiation Protocol message.

DETAILED DESCRIPTION OF THE PREFERRED EMBODIMENTS

Figure 1:
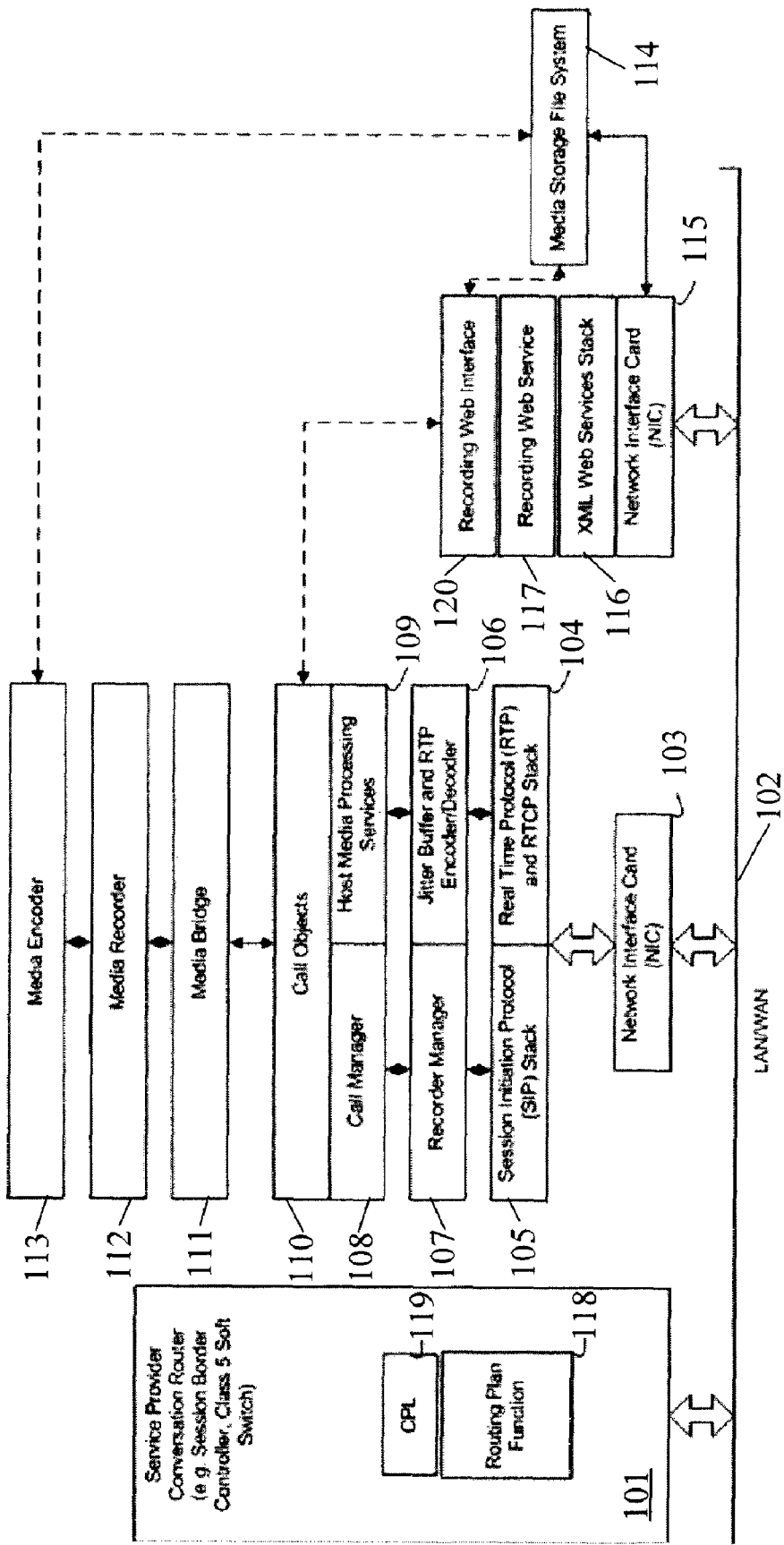
FIG. 1 is a schematic block diagram of an exemplary conversation interception system according to the present invention.

The following description is intended to provide a description of certain background methods and technologies which are optionally used in the method and system of the present invention. The present invention is specifically not drawn to these methods and technologies alone. Rather, they are used as tools to accomplish the goal of the present invention.

The system and method of the present invention are particularly intended for operation with internet telephony networks constructed according to the Session Initiation Protocol (SIP, IETF RFC 3261) and Session Description Protocol (SDP, IETF RFC 2327). Therefore, both RFC 3261 and 2327 are incorporated by reference. The method also specifically leverages the Real Time Protocol (RTP, IETF RFC 1889) specification for media transport.

SIP defines several behaviors for the initiation, negotiation, continuation, and termination of conversations between two endpoints. It is a lightweight, request/response protocol intended to facilitate peer-to-peer messaging and communications. The protocol structure is similar to hyper text transport protocol (HTTP), in the sense that there is a message header/body structure. The header, in a sense, is the envelope for the message, often containing request/response parameters, addressing, and content length and encoding parameters. The body can contain any arbitrary content, but typically contains SDP (especially in telephony). Or if the SIP message is a MESSAGE request, the body typically contains an instant message.

SDP describes the details of a media (audio/video) session. It typically contains information about the format, timing, connection, and streaming or multicast nature of the media session. When used in combination with SIP, the SDP is an offer/answer model. Both endpoints exchange SDP to detail their half of a duplex media session. Optionally, SDP can be used to setup a half-duplex media session (e.g. music on hold). One of the components of an SDP message is the description of the connection information. Connection information typically includes a UDP port which is prepared to receive RTP.

RTP is basically a common structure for sending real-time sensitive data such as audio or video. An RTP packet is a packet which contains information about the enclosed media content, and a timestamp which can be used to synchronize and reassemble a media stream at an endpoint. RTP is often delivered over a connectionless protocol, such as UDP, to ensure low-latency delivery of media streams.

RTP packets often do not arrive in order, due to the connection-less nature of the underlying transport. When RTP packets do not arrive in order, a component known as a "jitter buffer" is used to re-assemble the out of order or latent RTP packets into a single, continuous media stream.

The present invention provides a method and system for intercepting audio, video, and messaging conversations across a wide area computer network, and in particular, selectively intercepting such conversations for the purposes of monitoring, storing, and contributing to those conversations.

The principles and operation of a method and a system according to the present invention may be better understood with reference to the drawings and the accompanying description.

Referring now to the drawings, FIG. 1 is a block diagram of a system for intercepting, recording, storing, monitoring, and contributing to an audio, video, or messaging conversation performed over a computer network. There are four major components to the present invention.

The first is the Service Provider Conversation Router 101. In the preferred embodiment of the present invention, that Conversation Router is a Class 5 SIP-based Soft Switch or Session Border Controller. That Conversation Router has two functions, a dial plan and routing function 118, and the ability to have additions or modules applied to routing functions 119.

The service provider conversation router 101 may communicate with a myriad of endpoints, utilizing a variety of signaling and media transport protocols. For example, the conversation router may converse with endpoints using MGCP, H.323, Signaling System 7, or Session Initiation Protocol.

The service provider conversation router 101 gets a variety of initiation requests to start conversations. For example, the service provider conversation router may get a SIP INVITE, a message that specifically requests conversation from a particular SIP endpoint with a peer endpoint. The destination address and diversion information of those initiation requests are inspected to establish a route to a particular conversation peer. That destination address and diversion information is tested against an established routing plan. Based upon the results of the routing plan, the message is routed, duplicated, or forked to a particular endpoint.

In order to promote flexibility in audio, video, and message routing plans, many conversation routers establish modules, scripts, or other additional facilities to enable logic control in the routing plan. For example, some platforms support the Call Processing Language (CPL, IETF RFC 2824) extensions to enable flexible call routing. That Call Processing Language extension is an XML-based template that enables flexible routing of calls based upon different parameters.

The CPL extensions not only provide logic functions, they also preferably contain mechanisms to make remote procedure calls and queries across a computer network. If they do not have that capability, it is still possible to use those extensions to route all calls to a particular endpoint, preferably the host media processor.

Preferably, the CPL extensions have the facilities to make remote procedure or query calls across a computer network. For example, some implementations have the facility to query a remote web service by using HTTP.

When an initiating endpoint initiates a conversation with a conversation router, that conversation router tests the incoming initiation against the routing plan and/or any extensions to that routing plan. In the preferred method, that router requests a third party service to determine whether the conversation should be routed to a recording device. An example decision flow for such a process is described in connection with drawing FIG. 2.

The flow chart in FIG. 2 begins with the receipt of an incoming SIP message in step 201. The message is parsed and it is determined whether the message contains valid addressing information. If no valid addressing information is present, step 202, then an error is returned, in step 203. When valid addressing information is present, the route is determined from the same message. Thereafter, in step 204, it is determined whether the route has additions or plans. If it does, then the CPLs are processed, step 205, and then performs the CPL action requiring a call to a third party web service. If no CPL action is needed, then the normal call processing is performed in step 206. Otherwise, a determination is made, in step 207, whether the third party web service returns a result indicating a need to intercept. If the result indicates that there is not a need to intercept, then the normal call processing is performed in step 208. When interception is called for, the call is redirected though SIP diversion to the recording endpoint in step 209.

In the preferred embodiment of the present invention, such third party web service is the recording web service 117. It is preferred, but not required, that this third party web service be invoked using HTTP and parameters such as originating address (i.e. phone number), terminating address, and other data are passed in the HTTP GET as query parameters.

An example of how that third party service validates and responds to an incoming routing request is shown in FIG. 3. In that example, an incoming HTTP request is received from a conversation router, in step 301. The HTTP request is parsed for address information, in step 302, and an association is created representing the actual originating and terminating address, in step 303. Filters are applied to determine whether interception should occur, in step 304 and, if not, a non-intercept action is returned 305. If interception should occur, then an action is returned indicating whether the call should be intercepted or not, in step 306. If not, a non-intercept action is returned 307. Otherwise, an intercept action is returned in step 308. One such filter, for example, is the "Blacklist" filter, which determines whether a certain address (e.g. direct incoming dial (DID), phone number, SIP address) can be intercepted. That originating and terminating pair, further, can be retrieved by the host media processor later in the process by utilizing the same recording web service 117.

If that third party service returns a message or result that indicates that the conversation should be intercepted, the conversation is routed to the host media processor. That routing can be done with or without state. When routing is performed without state, the subsequent conversation occurs directly between the endpoint and the recording device. In the preferred embodiment, this is not a stateless transaction, and the conversation router 101 maintains a conversation directly with the initiating endpoint. The rationale behind this is that the host media processor does not need to be cognizant of wide area network issues, such as network address traversal (NAT). In essence, the preferred embodiment of the present invention assumes the conversation router is a B2BUA.

The second component is the Host Media Processing Unit. That component includes one or more Network Interface Cards (NICs) or other suitable device 103, which enable access and connectivity to the computer network 102. The computer network can be a Local Area Network (LAN) or Wide Area Network (WAN), for example. The NIC 103 is preferably any standard, off-the-shelf commercial product which enables the Host Media Processing Unit to be connected to any suitable computer network (for example, Intel PRO/100 VE Network or the NE2000 Adapter manufactured by Novell or any other such suitable product). Examples of such suitable computer networks include, but are not limited to, any standard LAN such as Ethernet (IEEE Standard 802.3), Fast Ethernet (IEEE Standard 802.10), Token Ring (IEEE Standard 802.5) and FDDI. Examples of the physical conduction mechanism include, but are not limited to, 100-Base-Tx, Optical Fiber, or CAT-6.

Only TCP/IP or UDP/IP packets on the computer network 102 are passed through the Network Interface Card 103 to the Session Initiation Protocol (SIP) Stack 105 or Real Time Protocol and RTCP Stack 104. Those packets preferably adhere to the Internet Protocol and contain various addressing information, including a port number and destination IP address, as defined by the Berkeley socket standard. The port number and destination IP address determine whether the SIP stack 105 or the RTP and RTCP stack 104 processes the packet. After that determination is made, the packet may be transferred to the SIP stack 105.

In the preferred embodiment of the current invention, there may be multiple network interface cards 103 and multiple host media processor units 109. Those units, further, might access the computer network 102 through a load balancing unit that load balances, clusters, or ensures redundant connectivity with other components, such as the conversation router 101. That redundancy and balancing can occur in a variety of fashions, in multiple levels of the Open Systems Interconnection Basic Reference Model (OSI Reference Model) (e.g. OSI Level 3: Networking Level (IP) or OSI Level 7: Application Level (SIP)).

The SIP stack 105 reads the packet into memory and proceeds to parse the packet to determine relevant addressing and diversion information. If the packet does not adhere to the SIP or SDP specifications incorporated by reference herein, the packet is rejected. If the packet does adhere to the SIP or SDP specifications incorporated herein, or approximates adherence to the specifications, the packet is fully processed and converted into a Message object.

The process of conversion from an in-memory packet to a Message object is accomplished by parsing the SIP grammar according to the SIP specifications incorporated therein. The Message object is composed of associations providing access to specific SIP header values by a header key. That abstraction aids the Host Media Processor in parsing, retrieving, and filtering SIP messages.

At this point the SIP request or response type is analyzed and compared against a list of call objects stored in memory 110. Once a call object has been identified, the SIP message is passed to the targeted call object 110, except for certain maintenance messages, an example being a SIP REGISTER request or 401 Unauthorized Response as a result of a registration attempt.

Call objects 110 are created upon receipt of the first SIP INVITE by the SIP stack. This SIP INVITE results in the instantiation and configuration of a call object. As SIP messages are received by a call object, the call object (either on the terminating or originating leg of the conversation, as previously defined) updates in memory state, and triggers events with the Media Bridge object 111.

Certain SIP requests and responses result in the creation of an active conversation, as defined as a state where both endpoints in either an originating or terminating leg are active and transmitting audio, video, or messaging content. That event and other events are transmitted to the media bridge 111.

The media bridge 111 has specific handlers for those event types. The most relevant handler is for SIP INVITES, received from an initiating SIP endpoint. When a SIP INVITE is received, the media bridge 111 inspects the Message object and determines, based upon a configurable route pattern, where to bridge the call. That route pattern includes information about the terminating conversation router 101 and a destination SIP address. In the preferred embodiment of the present invention, that address might be the same terminating address (e.g. SIP "To" header) contained in the initiating SIP INVITE. At that point, another SIP INVITE message is constructed by a newly instantiated in memory call object 110. That call object passes this new SIP INVITE to the call manager 108 who then passes it through the recorder manager interface 107 to the SIP stack 105 who transmits the SIP INVITE through the NIC 103 onto the computer network 102.

The addressing of this SIP INVITE, in the preferred method, may be determined by querying the recording web service 117, and passing the originating address to determine the terminating address. In certain cases, that is not required, since the originating and terminating address of the initiating INVITE may be intact, after processing of the dial plan by the conversation router 101.

Based upon the conversation control mechanism specified in the SIP specification incorporated herein, call processing occurs on both the initiating and terminating legs of the conversation. Call processing may or may not involve other third party intermediaries, such as session border controllers or other SIP or non-SIP endpoints.

When a conversation is considered to be active, media transmission occurs on both originating and terminating legs. In the preferred embodiment of the present invention, that is indicated by receiving or sending a SIP 200 OK response to the original INVITE request on either the initiating or terminating legs of the conversation. That 200 OK response involves the exchange of SDP, which indicates a terminating and originating RTP address for the relevant conversation leg.

When other events occur in the preferred embodiment of the present invention, those events are bridged by the media bridge 111 from the leg on which those events occur to the complementary leg of the conversation. A classic example of this is SIP holds, where the SDP of the SIP re-Invite contains "recvonly" or "inactive" references.

When a conversation is considered to be active, as previously defined, media transmission begins. When the initiating endpoint transmits audio, video, or messaging (media) packets over any available transport to the service provider conversation router 101 that media is transmitted to the Host Media Processing Unit. The transmission preferably occurs over UDP/IP in the form of RTP. RTCP packets may be optionally transmitted as well to synchronize streams and provide clock facilities.

The RTP and RTCP packets are transmitted from the service provider conversation router 101 to the host media processor unit, where they are received by the NIC 103. An examination of the packet occurs by the socket facilities of the host media processing unit. The destination port and address are specifically analyzed to determine if the packet should be transmitted to the RTP and RTCP stack 104. If that determination is made, the packet is decoded, re-ordered, synchronized, and processed to produce a consistent media stream that represents the audio, video, or messaging content originally transmitted by the initiating endpoint, where Audio packets include dual tone, multi-frequency (DTMF, IETF RFC 2833) digit tones.

When the media bridge 111 receives those packets, they are transmitted to the complementary leg of the conversation through the host media processing services 109 where they are passed through an encoding and jitter buffer process 106, packetized through the RTP and RTCP stack 104 where they are finally transmitted through the NIC 103 to the computer network 102. The destination of those packets is preferably determined by the SIP INVITE, 200 OK Response negotiations established before media transport is started.

The media bridge 111 may optionally normalize the media streams. Normalization is the process of converting the audio, video, or messaging content in the media stream into a least common denominator format and then re-encoding that least common denominator format into the target media stream before being transported to an endpoint.

When a conversation is considered to be active, the bridged packets are transmitted to the media recorder 112, which may perform additional functions, such as mixing, creating a stereo stream, or further normalization of the stream. At that point, a unique file path or descriptor is created identifying the particulars of an interception.

That file-path or descriptor, in the preferred embodiment of the invention, is an actual location on a magnetic or optical drive, but can be more intangible, such as a network sink, another IP address, or other streaming service.

The consistent media stream is then passed to the media encoder 113. That encoder captures the consistent media stream and performs a transform to reduce the data size requirements of the original stream. Such a compression technique in the preferred implementation is a lossy compression scheme, such as MPEG 2.5 Layer III, but it can also be a straight pass through of the original stream to the destination file path or descriptor.

It is important to note that this compression and storage routine may be accomplished in-line, or as a post process. In a post process approach, the incoming, synchronized audio, video, or messaging streams are packetized and stored in an in-memory, persistent, or network queue by the media recorder object 112. That queue is then accessed by another virtual or physical process or thread for trans-coding, storage, or streaming.

While conversation processing is active, the call object 110, or a listener subroutine on the call object 110, is listening for conversation processing events. As events occur on any conversation leg, those events are transmitted to the recording web service 117. That transmission can be accomplished by a variety of methods, but the preferred method is a HTTP POST, using a XML Web Services schema, based upon a standard interface specification (e.g. Web Services Description Language (WSDL)).

The recording web service 117 represents those individual call objects as indexed records in an in-memory or persistent database. In the example embodiment of this invention, that database is a Microsoft SQL Server, although other persistence technologies can be used.

The attributes of that indexed record include, but are not limited to, calling line identification (CLI) information, terminating line identification (TLI) information, the date and time of the conversation, and a description identifying the station that is being intercepted. An attribute of the record is the location of the file or stream, on the media storage file system 114. An additional attribute is whether or not to store the recording based upon user definable parameters, such as time of day. That attribute is often determined as part of a query of the recording web service 117.

The same web service 117 preferably presents a web interface 120 for accessing those records. The records are summarized and indexed, in real-time, to provide efficient and scalable access to historical recordings and provide facilities to contribute to current interceptions. When an end-user attempts to access a historical recording, the recording is streamed off of the media storage file system 114.

When an end-user wants to contribute to a particular intercepted conversation, the web interface 120 presents a listing of currently intercepted conversations. That listing provides information about the interception, including but not limited to the CLI and TLI of the call, the intercepted initiating or terminating endpoint, and the date and time when interception began. Additionally, contribution options are provided. Methods of contribution include, but are not limited to, "whisper", "barge", and "monitor". Whisper is the function where the intercepted endpoint in conversation with a secondary endpoint (regardless of initiation) can converse with a third endpoint without the secondary endpoint being able to witness the conversation. Barge is the function where a third endpoint can enter and contribute to an existing conversation between two endpoints. Monitor is the function where a third endpoint can witness, but not contribute to, an existing conversation between two endpoints.

Those functions are preferably exposed through the web interface 120. When an end-user initiates any one of those functions, they are prompted to enter an address for a contribution endpoint. Optionally, that address may already be associated with the end-user. When that information is entered and validated, the web interface 120 uses the recording web service 117 to request the media bridge 111 to add a contribution leg to the call by inviting the contribution endpoint into a conversation. For example, a SIP invite will be sent to a Polycom phone and the resulting media streams will be bridged with the existing media bridge.

In the case of the whisper function, that media bridge is half-duplex. Audio, video, or messaging is only bridged from the contribution leg to the endpoint that is being intercepted. In the case of the monitor function, the contribution leg is also half-duplex. Audio, video, and messaging is transmitted to the contribution endpoint but not received from the contribution endpoint.

While a preferred embodiment has been set forth in detail above, those skilled in the art will readily appreciate that other embodiments can be realized within the scope of the invention. For example, numerical values are illustrative rather than limiting, as is the order in which steps are carried out. Moreover, one or two of the above-noted scalars can be used; similarly, any or all of the above-noted scalars can be used in combination with other scalars. Therefore, the present invention should be construed as limited only by the appended claims.

What is claimed is:

1. A method of handling conversations between an initiating conversation endpoint and a terminating conversation endpoint, the method comprising the steps of:

examining an invitation from the initiating conversation endpoint at a conversation router to determine an action based on at least one of information in the invitation and a routing plan of the conversation router;

transmitting a request to a service data center based on the action;

inspecting the request at the service data center and querying a call objects database to determine whether the conversation is to be recorded;

sending a message from the service data center to the conversation router when the conversation is to be recorded;

communicating a conversation initiation request to a host media processor upon receipt of the message;

establishing at the host media processor a call object in the call objects database based on the conversation initiation request; and creating two conversation legs with a first conversation leg between the initiating conversation endpoint, the conversation router, and the host media processor, and a second conversation leg between the host media processor, the conversation router, and the terminating conversation endpoint;

wherein conversation requests and responses that occur during the conversation on one of the two conversation legs are passed to the other of the two conversation legs.

2. The method of handling conversations according to claim 1, wherein the conversation router supports additions to the routing plan and the examining step comprises examining the invitation based on information in the invitation, the routing plan, and additions to the routing plan.

3. The method of handling conversations according to claim 2, wherein the additions adhere to a Call Processing Language (CPL) specification.

4. The method of handling conversations according to claim 1, wherein the initiating conversation endpoint and the terminating conversation endpoint comprise an initiating Session Initiation Protocol (SIP) endpoint and a terminating SIP endpoint, respectively.

5. The method of handling conversations according to claim 4, wherein the initiating and terminating SIP endpoints comprise at least one of a SIP interoperable telephone, a telephone trunk, a public switched telephone network (PSTN) gateway, and a Private Branch Exchange (PBX).

6. The method of handling conversations according to claim 1, wherein the step of transmitting the request to the service data center comprises transmitting the request to multiple service data centers.

7. The method of handling conversations according to claim 1, wherein the host media processor comprises multiple Network Interface Cards (NICs) and the step of communicating the conversation initiation request to the host media processor comprises communicating the conversation initiation request to the host media processor through one of the multiple NICs.

8. The method of handling conversations according to claim 1, wherein the host media processor comprises protocol stacks for Session Initiation Protocol (SIP) and Real Time Protocol (RTP), and wherein the SIP stack is used to initiate the conversation and the RTP stack is used to maintain the conversation.

9. The method of handling conversations according to claim 8, wherein the conversation router comprises a Class 5 SIP-based switch.

10. The method of handling conversations according to claim 8, wherein the host media processor further comprises a jitter buffer and a RTP encoder and decoder.

11. The method of handling conversations according to claim 1, wherein the service data center comprises at least one media storage file system used to store data for the conversation.

12. The method of handling conversations according to claim 11, wherein the host media processor comprises a media encoder and the method further comprises encoding and storing the data for the conversation when the conversation is to be recorded.

13. The method of handling conversations according to claim 1, wherein the step of inspecting the request by the service data center comprises applying filters to the request to determine whether the conversation should be intercepted.

14. The method of handling conversations according to claim 1, wherein the host media processor comprises a media bridge and the method further comprises negotiating and encoding a media format for the conversation.

15. The method of handling conversations according to claim 14, wherein the step of negotiating and encoding a media format for the conversation comprises negotiating and encoding separate media formats for the two conversation legs.

16. The method of handling conversations according to claim 1, further comprising providing a recording user interface to allow a user to access the call object database.

17. The method of handling conversations according to claim 16, further comprising allowing the user to monitor or contribute to the conversation through access to at least one of the two conversation legs.

18. An apparatus for handling conversations between an initiating conversation endpoint and a terminating conversation endpoint, comprising:

a conversation router, the conversation router having a routing plan;
at least one host media processor; and
a service data center;
wherein the conversation router is configured to examine an invitation based on at least one of information in the invitation and the routing plan and to transmit a request to a service data center;
wherein the service data center is configured to inspect the request, query a call objects database to determine whether the conversation is to be recorded, and send a message to the conversation router when the conversation is to be recorded;
wherein the host media processor is configured to receive a conversation initiation request from the conversation router, establish a call object in the call objects database based on the conversation initiation request, and to create two conversation legs with a first conversation leg between the initiating conversation endpoint, the conversation router, and the host media processor, and a second conversation leg between the host media processor, the conversation router, and the terminating conversation endpoint; and
wherein the apparatus is configured to pass conversation requests and responses that occur during the conversation on one of the two conversation legs to the other of the two conversation legs.

19. The apparatus according to claim 18, wherein the conversation router further comprises additions to the routing plan and the conversation router is configured to examine the invitation based on information in the invitation, the routing plan, and the additions to the routing plan.

20. The apparatus according to claim 19, wherein the additions adhere to a Call Processing Language (CPL) specification.

21. The apparatus according to claim 18, wherein the initiating conversation endpoint and the terminating conversation endpoint comprise an initiating Session Initiation Protocol (SIP) endpoint and a terminating SIP endpoint, respectively and the conversation router is configured to interact with the initiating and terminating SIP endpoints.

22. The apparatus according to claim 21, wherein the initiating and terminating SIP endpoints comprise at least one of a SIP interoperable telephone, a telephone trunk, a public switched telephone network (PSTN) gateway, and a Private Branch Exchange (PBX).

23. The apparatus according to claim 18, wherein the service data center comprises multiple service data centers.

24. The apparatus according to claim 18, wherein the host media processor comprises multiple Network Interface Cards (NICs).

25. The apparatus according to claim 18, wherein the host media processor comprises protocol stacks for Session Initiation Protocol (SIP) and Real Time Protocol (RTP), and wherein the SIP stack is used to initiate the conversation and the RTP stack is used to maintain the conversation.

26. The apparatus according to claim 25, wherein the conversation router comprises a Class 5 SIP-based switch.

27. The apparatus according to claim 25, wherein the host media processor further comprises a jitter buffer and a RTP encoder and decoder.

28. The apparatus according to claim 18, wherein the service data center comprises at least one media storage file system used to store data for the conversation.

29. The apparatus according to claim 28, wherein the host media processor comprises a media encoder and the host media processor is configured to encode and store the data for the conversation when the conversation is to be recorded.

30. The apparatus according to claim 18, wherein the service data center is configured to apply filters to the request to determine whether the conversation should be intercepted.

31. The apparatus according to claim 18, wherein the host media processor comprises a media bridge and the host media processor is configured to negotiate and encode a media format for the conversation.

32. The apparatus according to claim 31, wherein the host media processor is configured to negotiate and encode separate media formats for the two conversation legs.

33. The apparatus according to claim 18, wherein the service data center comprises a recording user interface to allow a user to access the call object database.

34. The apparatus according to claim 33, wherein the recording user interface is configured to allow the user to monitor or contribute to the conversation through access to at least one of the two conversation legs.

* * * * *